(12) United States Patent
Nolet et al.

(10) Patent No.: US 7,908,238 B1
(45) Date of Patent: Mar. 15, 2011

(54) PREDICTION ENGINES USING PROBABILITY TREE AND COMPUTING NODE PROBABILITIES FOR THE PROBABILITY TREE

(75) Inventors: Michiel Nolet, New York, NY (US); Charles Brian O'Kelley, New York, NY (US); Boris Mouzykantskii, Kenilworth (GB)

(73) Assignee: Yahoo! Inc., Sunnyvale, CA (US)

( * ) Notice: Subject to any disclaimer, the term of this patent is extended or adjusted under 35 U.S.C. 154(b) by 795 days.

(21) Appl. No.: 11/848,688

(22) Filed: Aug. 31, 2007

(51) Int. Cl.
G06F 9/44 (2006.01)
G06N 7/02 (2006.01)

(52) U.S. Cl. .............................. 706/52; 705/10; 709/203
(58) Field of Classification Search .................. None
See application file for complete search history.

(56) References Cited

U.S. PATENT DOCUMENTS

| | | | |
|---|---|---|---|
| 5,401,946 A | 3/1995 | Weinblatt | |
| 5,515,270 A | 5/1996 | Weinblatt | |
| 5,704,017 A | 12/1997 | Heckerman et al. | |
| 5,778,367 A | 7/1998 | Wesinqer, Jr. et al. | |
| 5,794,210 A | 8/1998 | Goldhaber et al. | |
| 5,855,008 A | 12/1998 | Goldhaber et al. | |
| 6,026,368 A | 2/2000 | Brown et al. | |
| 6,078,866 A | 6/2000 | Buck et al. | |
| 6,134,532 A | 10/2000 | Lazarus et al. | |
| 6,236,977 B1 | 5/2001 | Verba et al. | |
| 6,269,361 B1 | 7/2001 | Davis et al. | |
| 6,285,987 B1 | 9/2001 | Roth et al. | |
| 6,324,519 B1 | 11/2001 | Eldering | |
| 6,327,574 B1 | 12/2001 | Kramer et al. | |
| 6,487,541 B1 | 11/2002 | Aggarwal et al. | |
| 6,591,248 B1 | 7/2003 | Nakamura et al. | |
| 6,631,360 B1 | 10/2003 | Cook | |
| 6,907,566 B1 | 6/2005 | McElfresh et al. | |
| 7,085,732 B2 | 8/2006 | Gould | |

(Continued)

FOREIGN PATENT DOCUMENTS

WO   WO 98/34189   8/1998

(Continued)

OTHER PUBLICATIONS

Unpublished U.S. Appl. No. 10/964,961 in the name of Brian O'Kelley, entitled System and Method for Learning and Prediction of Online Advertisements, filed Dec. 7, 2004, pending, 31 pages.

(Continued)

*Primary Examiner* — Donald Sparks
*Assistant Examiner* — Kalpana Bharadwaj
(74) *Attorney, Agent, or Firm* — Brinks Hofer Gilson & Lione

(57) ABSTRACT

There are methods and apparatus, including computer program products, for providing a probability tree of nodes in which each node is associated with a tries value and a success value, and at least one node is associated with a computed probability value representative of a predicted response rate for an advertisement creative; and computing a first probability value for a first node of the probability tree based on its associated tries value and success value, and a computed probability value associated with a parent node to the first node. In one exemplary embodiment, the first probability is computed according to the following equation:

$$\text{Probability} = \frac{(1 + Success_{node} - Success_{Child})}{\left(tries_{node} + \dfrac{1}{probability_{Parent}} - tries_{child}\right)}$$

23 Claims, 11 Drawing Sheets

U.S. PATENT DOCUMENTS

| | | | |
|---|---|---|---|
| 7,539,697 | B1 | 5/2009 | Akella et al. |
| 2002/0116313 | A1 | 8/2002 | Deterinq |
| 2003/0004806 | A1 | 1/2003 | Vaitekunas |
| 2003/0046161 | A1 | 3/2003 | Kamangar et al. |
| 2003/0135460 | A1 | 7/2003 | Talegon |
| 2003/0154126 | A1 | 8/2003 | Gehlot et al. |
| 2003/0187767 | A1 | 10/2003 | Crites et al. |
| 2003/0216930 | A1 | 11/2003 | Dunham et al. |
| 2003/0220918 | A1 | 11/2003 | Roy et al. |
| 2003/0229531 | A1 * | 12/2003 | Heckerman et al. ............ 705/10 |
| 2004/0034570 | A1 | 2/2004 | Davis |
| 2004/0068436 | A1 | 4/2004 | Boubek et al. |
| 2004/0103024 | A1 | 5/2004 | Patel et al. |
| 2004/0148222 | A1 | 7/2004 | Sabella et al. |
| 2004/0167845 | A1 | 8/2004 | Corn et al. |
| 2004/0186776 | A1 | 9/2004 | Llach |
| 2006/0080239 | A1 | 4/2006 | Hartog |
| 2006/0122879 | A1 | 6/2006 | O'Kelley |
| 2007/0067215 | A1 | 3/2007 | Agarwal et al. |
| 2007/0179856 | A1 | 8/2007 | O'Kelley |
| 2007/0185779 | A1 | 8/2007 | O'Kelley |
| 2007/0192217 | A1 | 8/2007 | O'Kelley et al. |
| 2007/0192356 | A1 | 8/2007 | O'Kelley |
| 2007/0198350 | A1 | 8/2007 | O'Kelley et al. |
| 2008/0071775 | A1 | 3/2008 | Gross |
| 2008/0091526 | A1 * | 4/2008 | Shoemaker ..................... 705/14 |
| 2009/0012852 | A1 | 1/2009 | O'Kelley et al. |
| 2009/0012853 | A1 | 1/2009 | Nolet et al. |
| 2009/0013031 | A1 | 1/2009 | Nolet et al. |
| 2009/0018907 | A1 | 1/2009 | McCarthy et al. |

FOREIGN PATENT DOCUMENTS

| | | |
|---|---|---|
| WO | WO 00/62173 | 10/2000 |
| WO | WO 01/01217 A2 | 1/2001 |
| WO | WO 2006/062760 A3 | 6/2006 |

OTHER PUBLICATIONS

Unpublished U.S. Appl. No. 11/848,742 in the name of Michiel Nolet, et al., entitled "Prediction Engines," filed Aug. 31, 2007, pending, 47 pages.

International Search Report for International application No. PCT/US2005/043071, May 30, 2007, 3 pages.

Supplementary European Search Report for European Patent Application No. EP2005000852373, Jan. 4, 2010, 7 pages.

Overture Services, Inc., Pasadena, CA 91103, "Sample Proposal", pages from http://www.content.overture.com/d/USm/abou/advertisers/sp_1st.jhtrnl , printed on Dec. 8, 2004, 16 pages.

D. Sullivan, GoTo Sells Positions, The Search Engine Report, Mar. 3, 1998 (4 pages).

Unpublished U.S. Appl. No. 11/848,742, in the name of Michiel Nolet, et al., entitled "Prediction Engines," filed Aug. 31, 2007, pending, 47 pages.

* cited by examiner

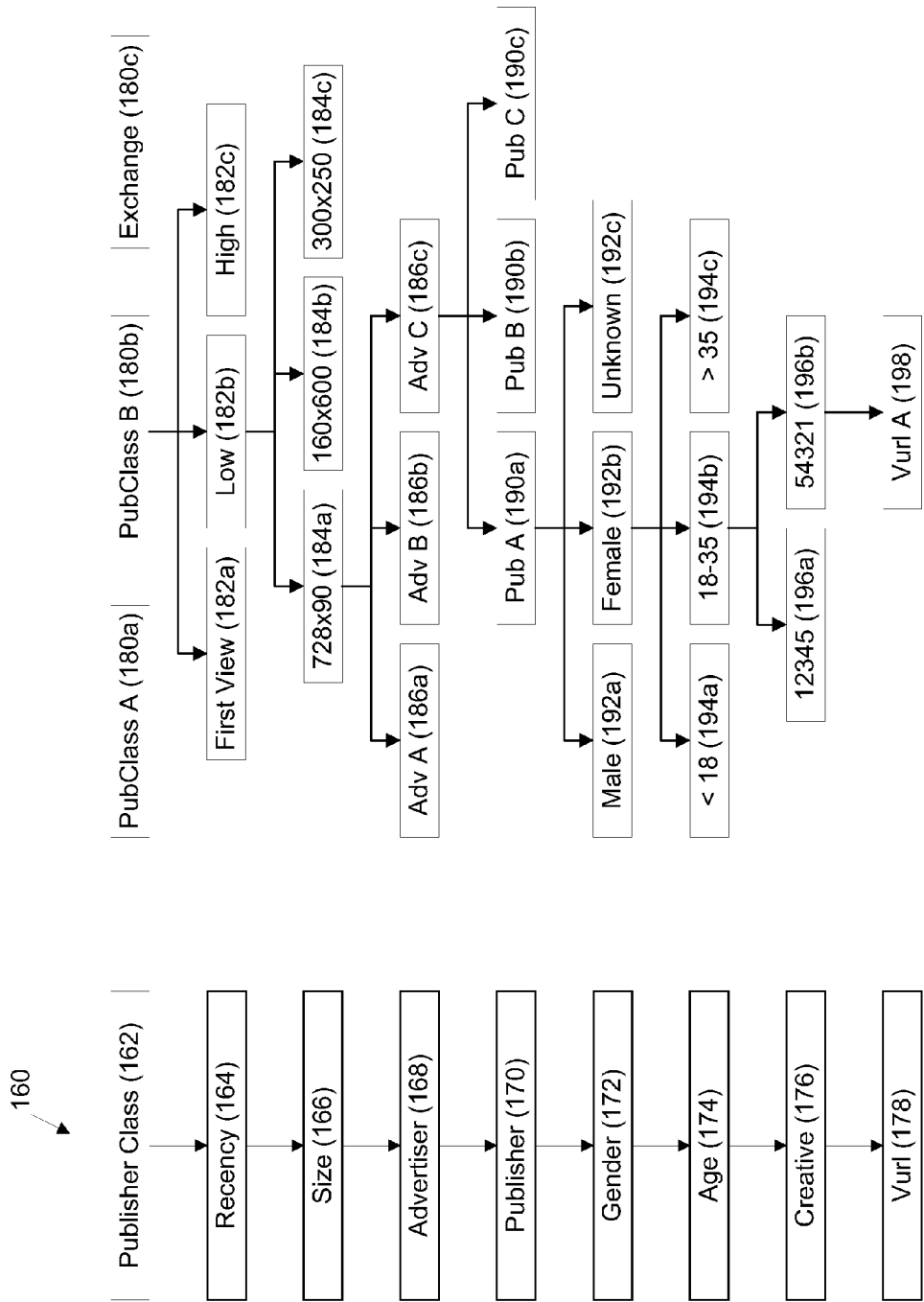

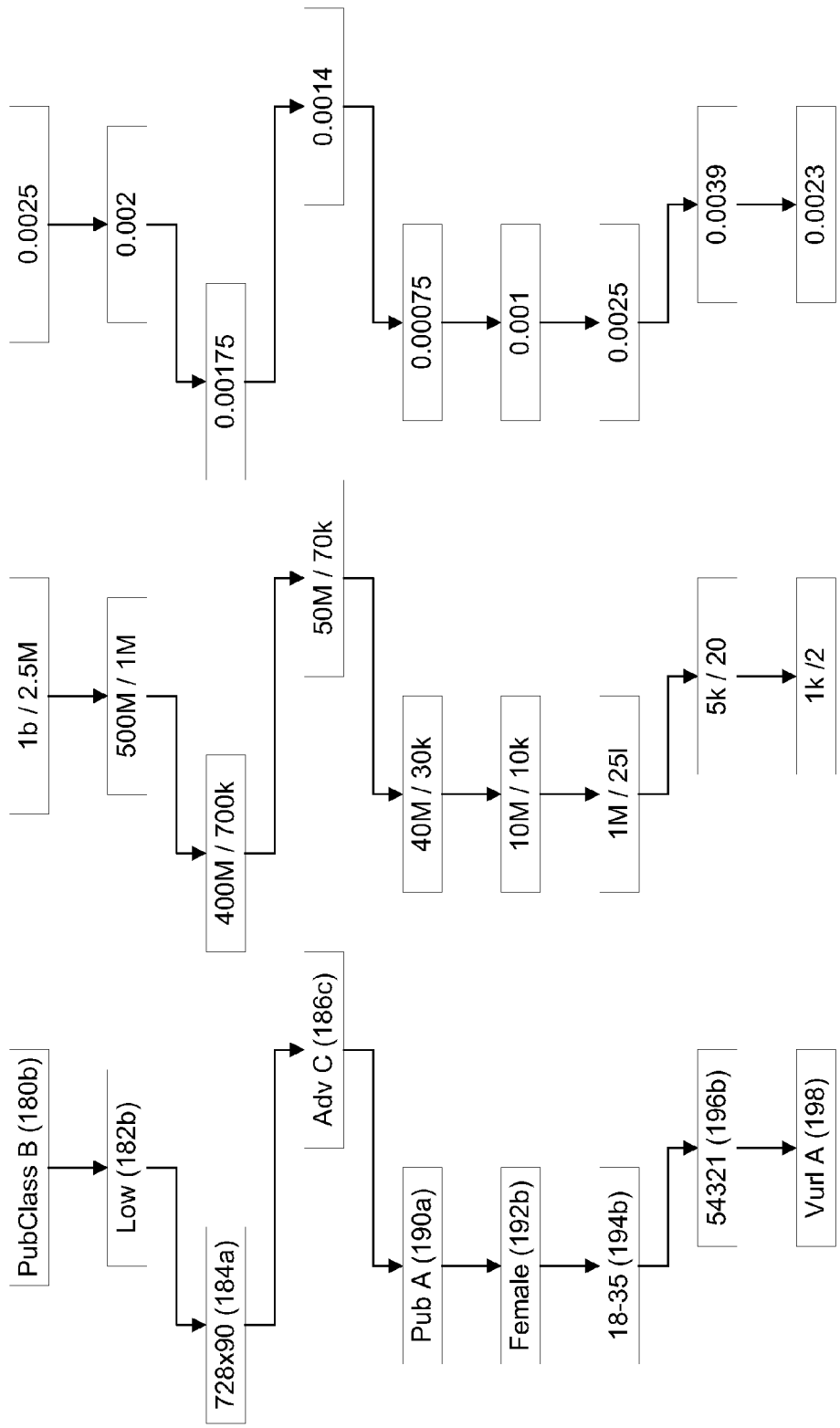

PREDICTION ENGINES USING PROBABILITY TREE AND COMPUTING NODE PROBABILITIES FOR THE PROBABILITY TREE

BACKGROUND

This description relates to prediction engines.

Electronic exchanges, including online auctions, have proliferated along with the Internet. These electronic exchanges aim to provide a high degree of trading efficiency by bringing together a large number of buyers and sellers. Such centralized exchanges are focused on directly matching the bids/offers of buyers and sellers, and may not recognize or account for pre-existing relationships or agreements with other exchanges or between parties to the transaction, such as between (i) buyers and sellers, (ii) intermediaries (e.g., brokers, which may be a buyer or seller), or (iii) buyers or sellers and intermediaries.

The proliferation of Internet activity has also generated tremendous growth for advertising on the Internet. Typically, advertisers (i.e., buyers of ad space) and online publishers (sellers of ad space) have agreements with one or more advertising networks (ad networks), which provide for serving an advertiser's banner or ad across multiple publishers, and concomitantly provide for each publisher having access to a large number of advertisers. Ad networks (which may also manage payment and reporting) may also attempt to target certain Internet users with particular advertisements to increase the likelihood that the user will take an action with respect to the ad. From an advertiser's perspective, effective targeting is important for achieving a high return on investment (ROI).

Online advertising markets display inefficiencies when buyers and sellers are unable to transact. For instance, although a publisher may be subscribed to many ad networks, and one or more of those ad networks may transact inventory with other ad networks, only one of the ad networks to which the publisher is subscribed will be involved in selling (e.g., auctioning) a given ad space for the publisher. The publisher, or a gatekeeper used by the publisher, selects or prioritizes which ad network (or advertiser having a direct agreement with the publisher) will serve the impression for a given ad request. Thus, the number of buyers for a given ad request is limited and, similarly, advertisers have limited access to ad requests.

SUMMARY

In a first aspect, the present disclosure provides a computer-implemented method which includes providing a probability tree of nodes in which each node is associated with a tries value and a success value, and at least one node is associated with a computed probability value representative of a predicted response rate for an advertisement creative. The method further includes computing a first probability value for a first node of the probability tree based on its associated tries value and success value, and a computed probability value associated with a parent node to the first node, wherein the first probability value is computed based on an algorithm that generates a probability value approximately equal to that of the parent node to the first node when the success value associated with the first node is low.

In a second aspect, the present disclosure provides a computer-implemented method which includes providing a probability tree of nodes in which each node is associated with a tries value and a success value, and at least one node is associated with a computed probability value representative of a predicted response rate for an advertisement creative. The method further includes computing a first probability value for a first node of the probability tree based on its associated tries value and success value, and a computed probability value associated with a parent node to the first node. The first probability value is computed by dividing the success value associated with the first node by the tries value associated with the first node when the success value associated with the first node is low.

In a third aspect, the present disclosure provides a computer-implemented method which includes providing a probability tree of nodes in which each node is associated with a tries value and a success value, and at least one node is associated with a computed probability value representative of a predicted response rate for an advertisement creative. The method further includes computing a first probability value for a first node of the probability tree based on its associated tries value and success value, and a computed probability value associated with a parent node to the first node. The first probability value may be computed according to the following equation:

$$\text{Probability} = \frac{(1 + Success_{node} - Success_{Child})}{\left(tries_{node} + \frac{1}{probability_{Parent}} - tries_{child}\right)}.$$

In a fourth aspect, the present disclosure provides a computer-implemented method which includes limiting a number of times advertisement impressions for a first creative are served on a particular publisher site to a throttling threshold that is based in part on a statistical accuracy of bids for the advertisement impression and providing a multi-level probability tree of nodes in which each node is associated with a computed probability value representative of a predicted response rate for an advertisement creative. The bids for advertisement impressions that are based on a computed probability value that is associated with a lower level tree node are more statistically accurate than the bids for advertisement impressions that are based on a computed probability value that is associated with a higher level tree node.

In a fifth aspect, the present disclosure provides a machine-readable medium that stores executable instructions to cause a machine to provide a probability tree of nodes in which each node is associated with a tries value and a success value, and at least one node is associated with a computed probability value representative of a predicted response rate for an advertisement creative. The instructions further cause a machine to compute a first probability value for a first node of the probability tree based on its associated tries value and success value according to the following equation $$\text{Probability} = \frac{(1 + Success_{node} - Success_{Child})}{\left(tries_{node} + \frac{1}{probability_{Parent}} - tries_{child}\right)},$$

and a computed probability value associated with a parent node to the first node.

Other general aspects include other combinations of the aspects and features described above and other aspects and features expressed as methods, apparatus, systems, computer program products, and in other ways.

Other features and advantages will become apparent from the description and the claims.

DESCRIPTION OF DRAWINGS

FIGS. 4 and 5 each show an exemplary click probability tree structure.

FIGS. 6B, 6C, and 6D each show aspects of the exemplary click probability tree structure of FIG. 5.

DETAILED DESCRIPTION

Figure 1:
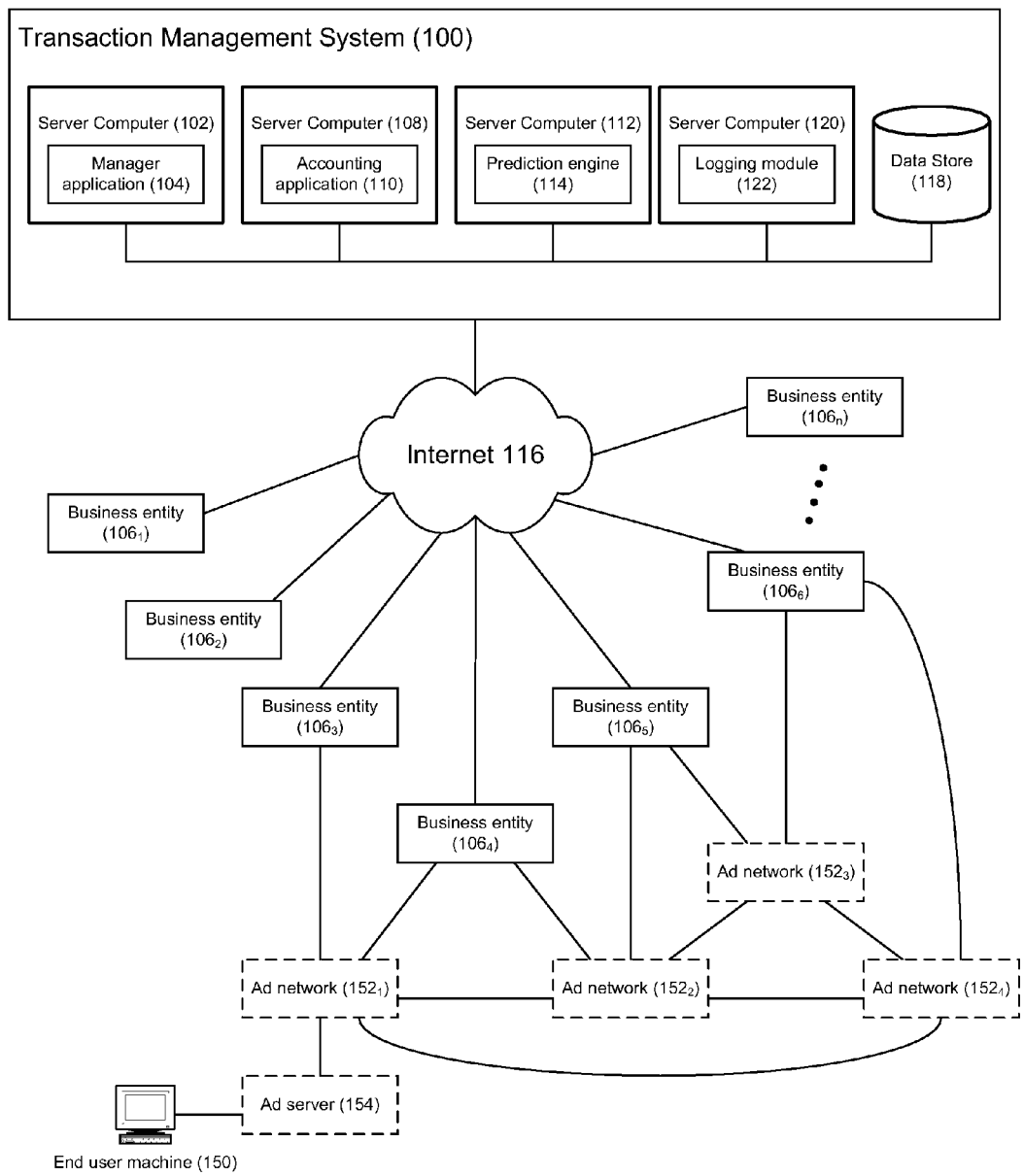
FIG. 1 shows a block diagram of an open advertisement exchange environment.

FIG. 1 shows a transaction management system 100 that is implemented as a multi-server system. The transaction management system 100 includes a server computer 102 that runs a manager application 104 to facilitate commercial transactions between business entities $106_{1...n}$, a server computer 108 that runs a computer program application ("accounting application" 110) to track and manage accounting activity associated with the commercial transactions, and a server computer 112 that runs a computer program application ("prediction engine" 114) to generate one or more predictive metrics for use by the manager application 104 in facilitating a commercial transaction.

Although the transaction management system 100 of FIG. 1 is described in the context of an open advertisement ("ad") exchange that connects business entities through the Internet 116, the techniques implemented by the transaction management system 100 are also applicable in non-advertisement-related contexts and non-open-exchange contexts. Further, although depicted as separate server computers, in some implementations, one or more of the applications run on a single server computer server computers, and additional/different applications may also be included in the transaction management system 100.

To participate on the ad exchange, each business entity $106_{1...n}$ registers with the transaction management system 100. Details of the types of information that a business entity $106_{1...n}$ may be requested or required to provide to the transaction management system 100 during the registration process can be found in U.S. patent application Ser. No. 11/669,690, entitled "Open Media Exchange Platforms;" filed on Jan. 31, 2007, the contents of which are hereby incorporated by reference in its entirety. The information provided by the business entities may be stored in a data store 118 (e.g., a database) coupled to the transaction management system 100 or accessible by the transaction management system 100 via a network (e.g., the Internet 116, a local area network, or a wide area network).

Once registered, the role of a business entity $106_{1...n}$ on the ad exchange is a function of the type of inventory the business entity manages for a given transaction. For example, if a business entity is managing an ad creative for a transaction, the role of the business entity is that of an "advertiser"; if a business entity is managing an ad space for a transaction, the business entity adopts the role of a "publisher." A business entity may be a company that directly manages its own creatives/spaces on the ad exchange, or a company that manages ad creatives and/or ad spaces on behalf of one or more other companies and/or ad networks ($152_1$-$152_4$).

Server computer 108 executes an accounting application 110 to track account activity for the business entities $106_{1...n}$. Pricing for transactions between the business entities $106_{1...n}$ may be provided according to any of one or more pricing models, including cost-per-thousand-impressions (CPM), cost-per-click (CPC), cost-per-action (CPA), and may be based on dynamic pricing, pricing based on soft targets, auction-based pricing, ROI goals, and other models. It will be understood that the pricing models presented below are merely for purposes of illustration. Additionally, in accordance with some embodiments of the present invention, transaction management system 100 may provide for subscribers to automatically upload and update their own pricing models (e.g., proprietary pricing models representing the subscriber's utility function with respect to ad space, and which may also depend on information about the end user machine 150), which transaction management system 100 calls upon (e.g., a function call) during the auction process. Further, while transaction management system 100 is described as calculating the probability that a consumer associated with the end user machine 150 will take some action (e.g., click probability), transaction management system 100 may be adapted so that such a probability may be calculated according to a subscriber's own function (e.g., which may be embodied in the subscriber's own pricing function).

Figure 2:
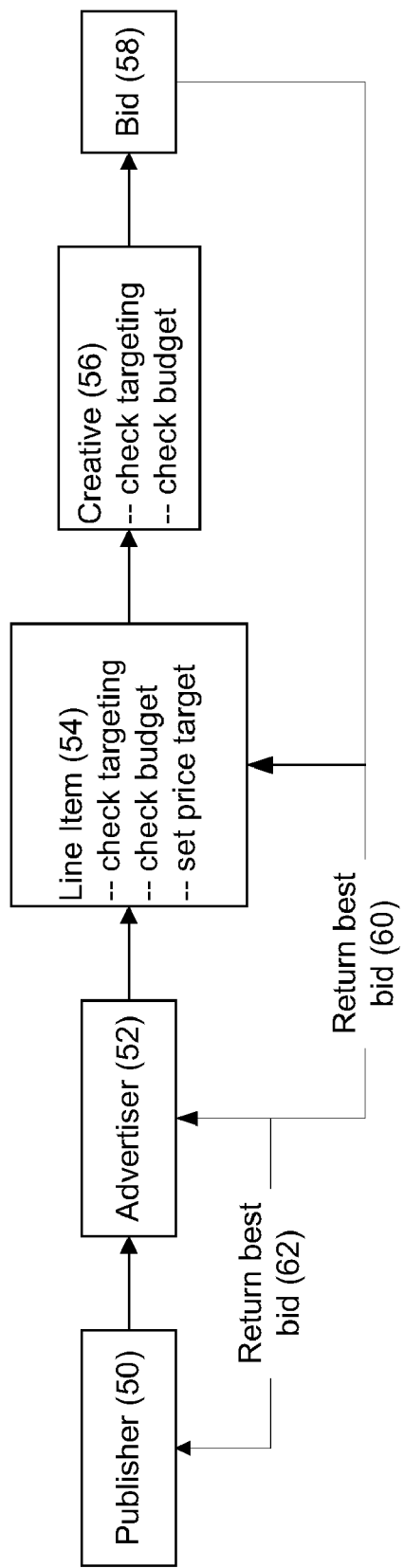
FIG. 2 shows an exemplary ad creative serving process.

FIG. 2 shows a process for selecting an ad creative to be served responsive to an ad call received by the ad exchange. A publisher posts a call for an advertisement to the transaction management system 100 (as indicated in block 50). The transaction management system 100 analyzes the available advertisements (also referred to herein as creatives) for each advertiser (as indicated in block 52). The transaction management system 100 checks multiple line items for each advertiser to see if the advertiser may have creatives that could be a potential match to be served for the call posted by the publisher (as indicated in block 54). Each advertiser can have multiple line items. The line items checked by the transaction management system can include targeting, budgeting, and/or a price target. Each line item can have multiple creatives associated with it. If there is a potential match between the advertiser and the posted call for an advertisement based on one or more of the line items for the advertiser, the transaction management system 100 checks information related to particular creatives associated with the line item (as indicated in block 56). For each creative associated with a line item, the transaction management system 100 checks the targeting information for the creative and checks the budget for the creative. The transaction management system 100 generates a bid for each of the creatives (as indicated in block 58) and determines the best (e.g., the highest) bid for the advertiser from the bids for each of the creatives (as indicated by arrow 60). The transaction management system 100 determines a particular ad creative to be served in response to the ad call based on the bids received from multiple different advertisers by selecting the best bid (e.g., the highest bid) from the multiple advertisers (as indicated by arrow 62). Details regarding the techniques that may be implemented by the transaction management system 100 for selecting an ad creative to be served responsive to an ad call received by the ad exchange can be found in U.S. patent application Ser. No. 11/669,690.

The probability that a user will act on an advertisement by clicking on the advertisement or converting on the advertisement (referred to herein as a predicted response rate for the advertisement) can differ based on various factors. For example, the probability that a user will act on an advertisement for sports equipment may be greater when the advertisement is placed on a sports related website such as CNNSI.com than when the advertisement is placed on a food related website such as recipes.com. Various factors such as the type of publisher, recency of the placement of the advertisement, size of the ad, advertiser, publisher, gender, age, particular ad characteristics, and the website the ad is posed on can affect the probability that the user will take action in response to the advertisement.

Figure 3:
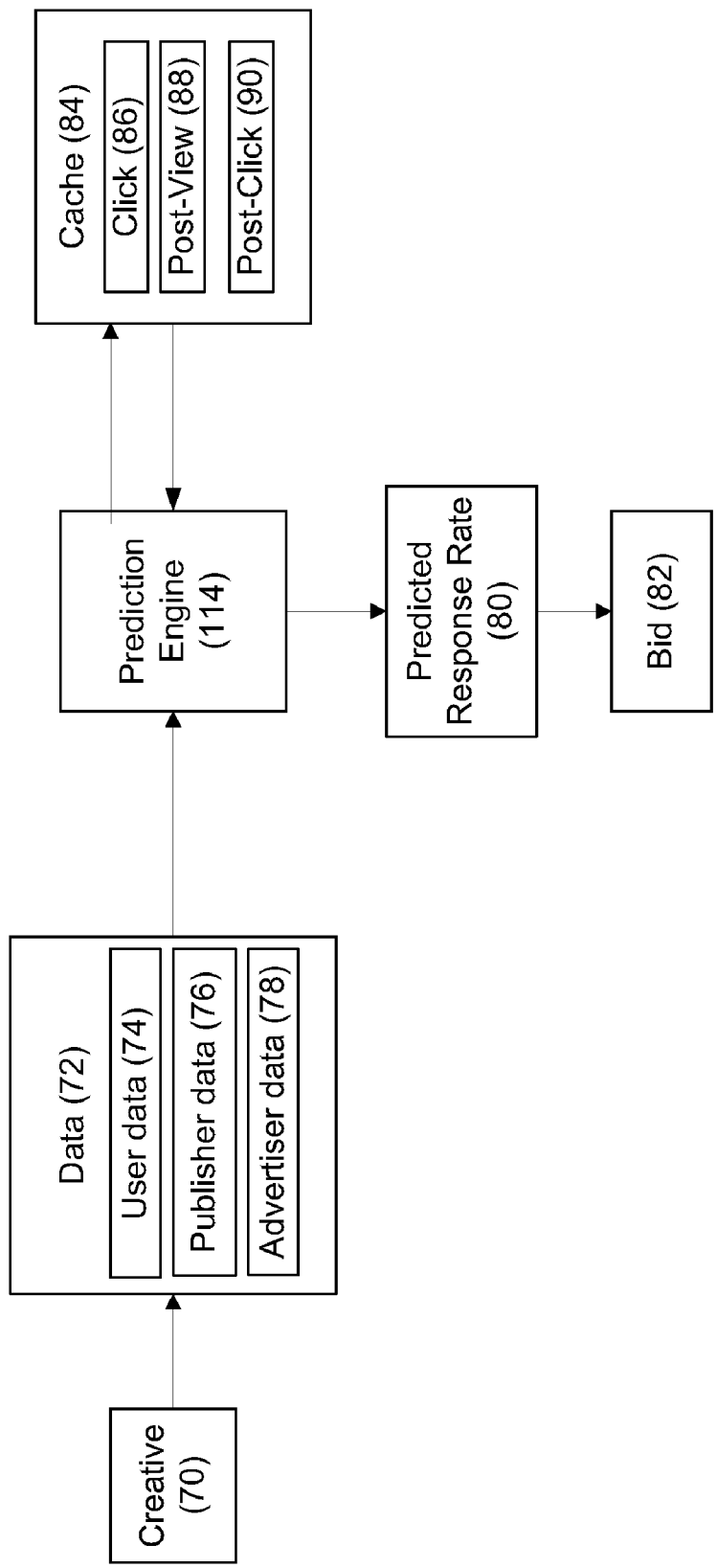
FIG. 3 shows an exemplary predicted response rate generation process.

FIG. 3 shows a process for gathering information and using the information to generate a predicted response rate that can be used to adjust an advertiser's bid for placement of an advertisement. When a publisher posts a call for an advertisement, the transaction management system 100 determines what creatives are a potential match for the posted call. If a particular creative 70 is a match for the posted ad call, the transaction management system 100 (FIG. 1) generates a bid 82 for the creative. The bid 82 factors in a predicted response rate 80 for the creative based on various factors related to the advertiser, user, and publisher.

More particularly, the prediction engine 114 collects a set of data 72 that includes user data 74, publisher data 76, and advertiser data 78. The user data 74 includes information available on the user that is visiting the publisher's website on which the advertisement will be posted (e.g., based on a cookie stored in the user's computer). Examples of user data 74 can include the frequency the user has visited a website, an age of the user, a sex of the user, and/or other information about the preferences of the user based on cookies stored on the user's computer. The publisher data 76 includes information about the publisher's identity, the URL on which the advertisement would be posted, attributes of the publisher, attributes of the publisher's website, attributes of the size and/or placement of the advertisement on the publisher's website. The advertiser data 78 includes information about the identity of the advertiser, the product or service to be shown in the advertisement, the goal of the advertising campaign, the look and feel of the creative, and/or other details related to the advertiser and creative to be posted by the advertiser. The prediction engine 114 uses the user data 74, publisher data 76, and advertiser data 78 to determine the predicted response rate 80 for the creative 70.

In order to determine the predicted response rate 80, the prediction engine 114 uses the data 72 to look up a response rate in a cache 84. The cache 84 stores historical probabilities about the predicted response rates for user/publisher/advertiser combinations. The pre-computed probabilities stored in the cache 84 can include predicted click rates 84, predicted post-view conversion rates 88, and/or predicted post-click conversion rates 90. The predicted click rates 86 indicate a likelihood that the user will click on the creative if the creative is posted. The predicted post-view response rates 88 indicate the likelihood of the user converting the advertisement after viewing the advertisement. The predicted post-click rates 90 indicate a likelihood that the user will convert the advertisement after clicking on the advertisement.

The cache 84 stores the predicted response rates in an ordered tree that is implemented in accordance with a data framework. In one example, the data framework includes a root node level that includes at least one publisher class node, one or more intermediate node levels, each intermediate node level including at least one intermediate node that is subordinate to the root node level, each intermediate node level being defined by a factor that affects a probability of a user action with respect to an advertisement creative, and a leaf node level that includes at least one uniform resource locator node that is subordinate to the one or more intermediate node levels. An ordered tree implemented in accordance with such a data framework accounts for factors that affect the probability that a user will act on a particular advertisement. These factors are arranged with factors that are more influential being located at nodes of the tree above factors that are less influential. The tree structure is also based on a logical ordering based on various one-to-many relationships. Each creative belongs to a single advertiser; each advertiser may have one or more creatives.

FIG. 4 shows an exemplary click probability tree structure 160 stores information related to the probability of a user clicking on a creative. The tree structure is arranged based on order of importance with the factors that have the largest influence on the probability that the user will click on the creatives are located at the top of the tree structure 160. The click probability tree structure 160 includes a publisher class 162 as the base node. The publisher class 162 is used to determine the click probabilities for large publishers separately. For example, some publishers post a significant number of advertisements every day. The probability of a user acting on a creative posted on Pub Class A (or another high volume website) may differ from the probability that a user would act on the same creative if posted on Pub Class B (or another high volume website). In order to account for such differences, large publishers with significant volume can be separated out for purposes of determining the probability that a user will act on a creative. Below the publisher class node 162, the click probability tree structure 160 includes a recency node 164. The recency node provides a measure of how recently the user viewed a particular creative. Below the recency node 164, the click probability tree structure 160 includes a size node 166. The size node 166 indicates the size (e.g., number of pixels) of the advertisement. The click probability tree structure 160 also includes an advertiser node 168 that indicates the identity of the advertiser and a publisher node 170 that indicates the identity of the publisher. The click probability tree structure 160 also includes a gender node 172 associated with the gender of the user and an age node 174 associated with the age of the user. The click probability tree structure 160 also includes a creative node 176 associated with the particular ad creative that is to be placed and a URL node 178 associated with the URL for the website on which the creative would be placed.

Each node in the tree structure is associated with a probability value. The probability value can be calculated according to the following equation:

$$\text{Probability} = \frac{(1 + \text{Success})}{\left(\text{tries} + \frac{1}{\text{probability}_{Parent}}\right)}$$

where probability represents the probability of the user taking the respective action for the node, success represents the number of times that the advertisement has been successful in generating the desired response (e.g., a click, a conversion), tries represents the number of times an advertisement has been posted, and probability$_{parent}$ represents the probability for the parent node on the tree structure (e.g., the node directly above the node for which the probability is being calculated). As summarized in table 1 below, what is meant by tries and successes varies dependent on whether the probability being calculated is a click probability, a post-view conversion probability or a post-click conversion probability.

TABLE 1

| Category | Tries | Successes |
|---|---|---|
| Click probability calculation | Impressions | Clicks |
| Post-view conversion probability calculation | Impressions | Conversions |
| Post-click conversion probability calculation | Clicks | conversions |

When a node has a low number of tries, then the probability of the parent node has a greater influence over the calculated probability for the node than when the node has a large number of tries. In the extreme case, when a particular node has zero tries and zero successes, then the probability for the node equals the probability of the parent node. At the other extreme, when the node has a very large number of tries, the probability of the parent node has a negligible impact on the probability calculated for the node. As such, when the node has a large number of tries, the probability is effectively the number of successes divided by the number tries. By factoring in the parent node probability in the calculation of a node's probability, a probability value may be obtained even if the granularity and/or size of the available data set on its own precludes the generation of a statistically accurate probability.

FIG. 5 shows an exemplary click probability tree 179 that includes publisher class nodes 180a, 180b, and 180c; recency nodes 182a, 182b, and 182c; size nodes 184a, 184b, 184c; advertiser nodes 186a, 186b, 186c; publisher nodded 190a, 190b, and 190c; gender nodes 192a, 192b, and 192c; age nodes 194a, 194b, and 194c; creative nodes 196a and 196b and a Vurl node 198. The publisher class nodes 180a, 180b, and 180c include nodes for PubA (node 180a) and Pub B (node 180b), both of which are large publishers that generate a large number of advertisements. Due to the large number of advertisements posted on Pub A and Pub B, the probability that a user will take action on an advertisement may differ based on which publisher's website the advertisement is posted on, therefore the estimation of probabilities for such Pub A and Pub B is computed separately from the other publishers on the exchange (e.g., as represented by node 180c).

The recency nodes 182a, 182b, and 182c, include a first-view node 182a, a low recency node 182b, and a high recency node 182c. In one example, the low recency node 182b indicates an elapsed time since the last viewing of a creative of greater than 1 hour; the high recency node indicates an elapsed time since the last viewing of a creative of less than 1 hour.

The size nodes 184a, 184b, 184c include different nodes based on the size of the creative. In this example, the size nodes are categorized based on the number of pixels in the advertisement and include a node 184a for advertisements that have a size of 728×90, a node 184b for advertisements that have a size of 160×600, and a node 184c for advertisements that have a size of 300×250. While in this example, the size of the node is categorized based on the number of pixels other factors could be used such as the orientation of the creative and/or a general size (e.g., small, medium, large) of the creative. In another example, the size nodes are replaced by placement nodes, where each placement node represents a placement defined by an advertisement size (e.g., 728×90) and type (e.g., leaderboard, banner, pop-up, pop-under, and skyscraper).

The advertiser nodes 186a, 186b, 186c 182c included in the click probability tree 179 include a node 186a for Adv A, a node 186b for Adv B, and a node 186c for Adv C. The publisher nodes 190a, 190b, and 190c include a node 190a for Pub A, a node 190b for Pub B, and a node 190c for Pub C. The gender nodes 192a, 192b, and 192c include a node 192a for males, a node 192b for females, and a node 192c for individuals for which the gender is unknown. The age nodes 194a, 194b, and 194c that are child nodes of node 192b include a node 194a for individuals in the age range of under 18 years old, a node 194b for individuals in the age range of 18 to 35 years old, and a node 194c for individuals over 35 years old. The creative nodes 196a and 196b include a node 196a for creative number '12345' and a node 196b for creative '54321.' Node 196b is a parent node for the Vurl node 198a for Vurl A.

The click probabilities for the nodes in the click probability tree 179 are updated based on the success or lack of success of an advertisement (e.g., whether the user took action based on the advertisement). An advertiser can use the click probabilities to determine a bid to place for an advertisement posted by an advertiser.

Figure 6A:
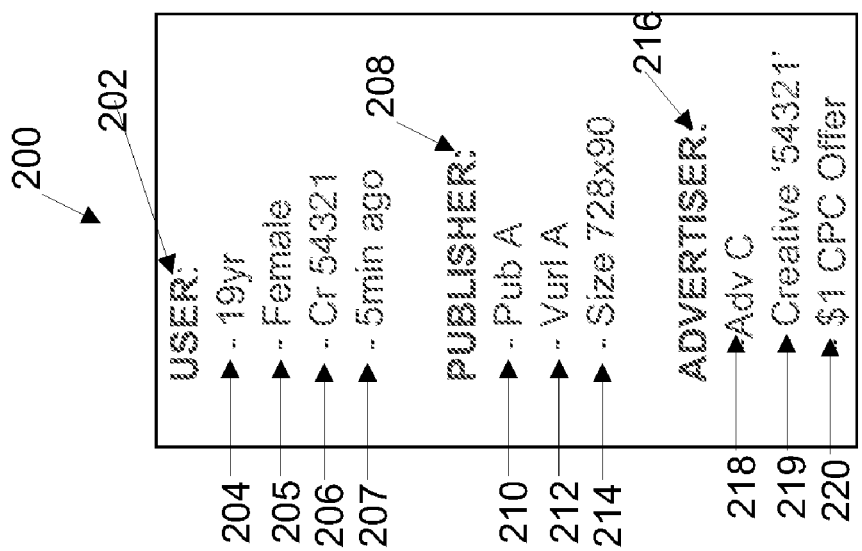
FIG. 6A shows a data set.

FIGS. 6A, 6B, and 6C show an example of generating and using the click probability tree 179 of FIG. 5 to determine a bid for an advertisement posed by a publisher. As shown in FIG. 6A, when a user accesses a website where a publisher will post an advertisement, the prediction engine 114 collects a set of data 200 that includes user data 202, publisher data 208, and advertiser data 216. The user data 202 includes the age 204 and sex 205 of the user. In addition, the user data 202 includes information about advertisements previously viewed by the user, in this example the user has viewed creative '54321' five minutes ago as shown in user data entries 206 and 207. The publisher data 208 includes the publisher name 210, the URL 212, and the size of for the advertisement 214. The advertiser data 216 includes the name of the advertiser 218 and the offer 220 for the advertisement.

The prediction engine 114 uses the user data 202, publisher data 208, and advertiser data 216 to determine a pathway within a probability tree that is associated with the characteristics of the creative for which a bid is being generated. FIG. 6B shows that path from the click probability tree 179 of FIG. 5 that applies based on the data 200 from FIG. 6A. In this example, the publisher name 210 in the collected publisher data 208 is PubClass B. Therefore, of the publisher nodes 180a, 180b, and 180c, the prediction engine 114 selects node 180b for Pub Class B. The timing information 207 in the user data 202 indicates that the user has viewed an advertisement 5 minutes ago. Based on this information, the prediction engine selects the low recency node 182b from the recency nodes 182a, 182b, and 182c in click probability tree 179. A size of 728×90 is included in the collected publisher data 208. Therefore, of the size nodes 184a, 184b, and 184c, the prediction engine 114 selects node 184a for a size of 728×90. The advertiser name 218 in the advertiser data 216 indicates that the advertiser for which the bid is being generated is Adv C. Based on this information, the prediction engine selects the Adv C node 186c from the advertiser nodes 186a, 186b, and 186c in click probability tree 179. The publisher data indicates that the publisher 210 is Pub A. Therefore, of the publisher 190a, 190b, and 190c, the prediction engine 114 selects node 190a for Pub A. The user data 202 indicates that the user is a 19 year old female. Based on this information the prediction engine selects the female node 192b of the gender nodes 192a, 192b, and 192c and node 194b for the age range of 18-25 years old. The creative indicator 219 included in the advertiser data 216 indicates that the advertiser indicates that a bid is being generated for creative '54321'. Based on this information, the prediction engine selects the node 196b for creative '54321.' Finally, the prediction engine looks at the particular website 212 on which the advertisement would be posted based on the information in the publisher data 208 and selects node 198 for Vurl A.

FIG. 6C shows exemplary numbers representing the tries and successes for each node in the probability tree of FIG. 6B. In each node, the first number represents the number to tries (e.g., the number of times an advertisement has been posted with the characteristics of the node) and the second number represents the number of successes (e.g., the number of times a user has clicked on the advertisement). For example, the numbers for node 180b are 1 b/2.5M indicating that there have been one billion times that an advertisement has been posted for publisher class of Yahoo and of those one billion times the creative has been posted 2.5 million have resulted in the user clicking on the advertisement.

FIG. 6D shows exemplary probabilities representing the probability a user would click on an advertisement with the characteristics of a node based on the tries and successes indicated in FIG. 6C. The prediction engine calculates the probabilities based on the information about the tries and successes using the formula of $$\text{probability} = \frac{(1 + \text{Success})}{\left(\text{tries} + \frac{1}{\text{probability}_{Parent}}\right)}.$$

The probability of the parent node, probability$_{parent}$, has little effect on the calculated probability for the nodes with a large number of tries. For example, for node 192b, the number of successes is 10,000 and the number of tries if 10 million. Therefore, if the probability of the node were based only on the number of successes divided by the number of tries, then the probability would be 10,000/10,000,000 which equals 0.001. The probability when calculated to include the probability of the parent node would be (1+10,000)/(10,000,000+ 1/0.00075) which equals 10,001/10,001,333 which equals 0.000999. Thus, for such a node having a large number of tries, the effect of the probability of the parent node is negligible.

In contrast, the probability of the parent node has a non-negligible effect on the calculated probability for the nodes with a small number of tries. For example, for node 196b, the number of successes is 5,000 and the number of tries if 20,000. Therefore, if the probability of the node were based only on the number of successes divided by the number of tries, then the probability would be 20/5,000 which equals 0.004. When the probability when calculated to include the probability of the parent node (e.g., 0.0025 for node 194b) the probability for node 196b is decreased. More particularly, the probability for node 196b would be (1+20)/(5,000+1/ 0.0025)= 21/5400=0.00388. Thus, for a node with a small number of tries, the effect of the parent probability is non-negligible.

The prediction engine 114 uses the calculated click probabilities to determine an amount of a bid for a particular creative. The bid is calculated based on the offer 220 included in the advertiser information 216 and the probability in the node furthest down the probability tree that includes a probability for the node. For example, the bid amount can be calculated according to the following equation: bid=offer*probability*1000. In the example of FIGS. 6A-6D, the offer is $1 cost-per-click (CPC) and node 198 indicates that the probability of the user clicking on the advertisement is 0.0023. As such, the bid=$1*0.0023*1000=$2.30.

Figures 7, 8:
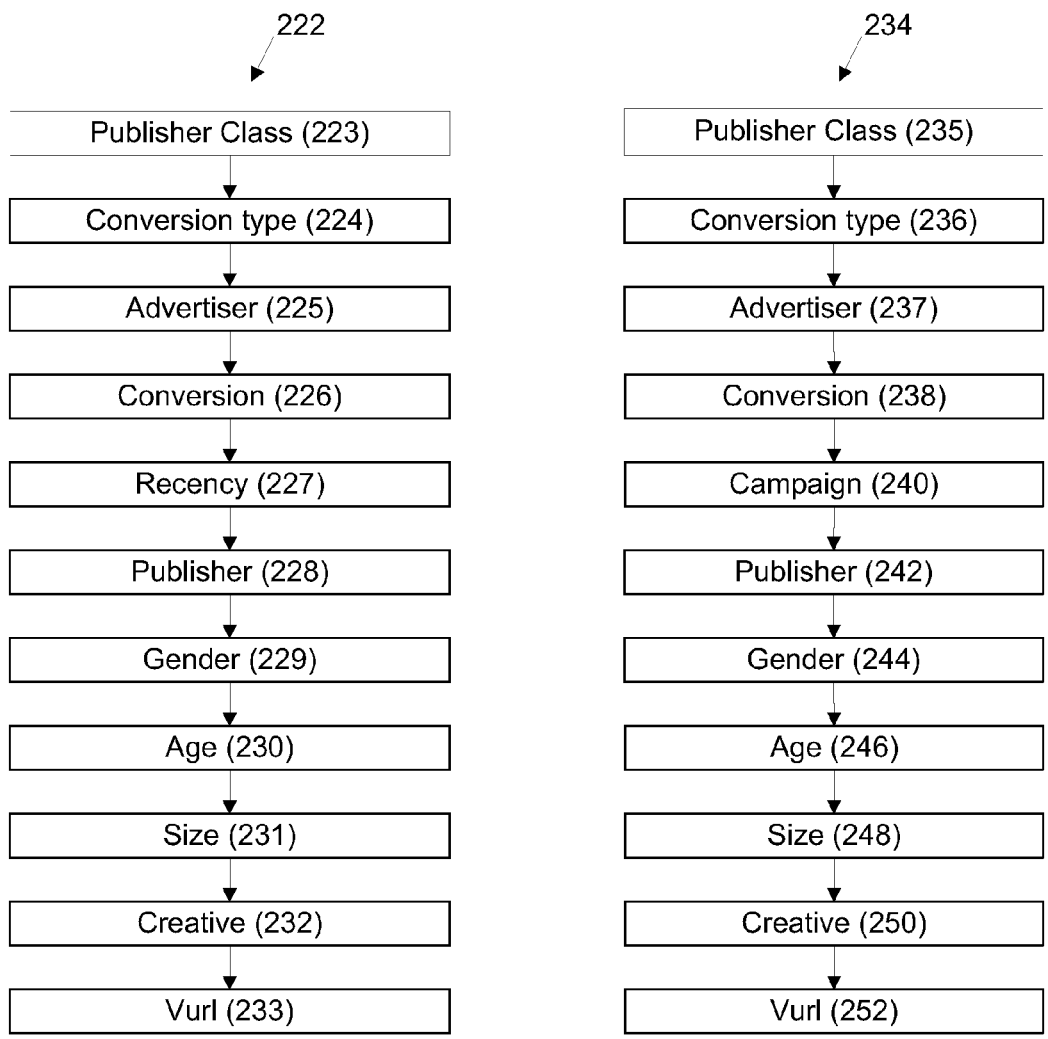
FIG. 7 shows an exemplary impression-conversion probability tree structure.
FIG. 8 shows an exemplary click-conversion probability tree structure.

While the above examples have been described based primarily on a click probability tree, other types of probability trees can be generated based on the probability that an impression will lead to a conversion or that the user will convert the ad after clicking on the advertisement. FIG. 7 shows an exemplary impression-conversion probability tree structure 222 that is used to store information related to the probability of a user converting the advertisement (e.g., entering information, generating an order, or taking other further actions) after viewing the advertisement. The tree structure is arranged based on order of importance with the factors that have the largest influence on the probability that the user will convert the advertisement being located at the top of the tree structure 222. The click probability tree structure 222 includes a publisher class node 223, a conversion type node 224, an advertiser node 225, a conversion node 226, a recency node 227, a publisher node 228, a gender node 229, an age node 230, a size node 231, a creative node 232 and a Vurl node 233.

FIG. 8 shows an exemplary click-conversion probability tree structure 234 that is used to store information related to the probability of a user converting the advertisement (e.g., entering information, generating an order, or taking other further actions) after clicking on the advertisement. The click-conversion tree structure 234 is arranged based on order of importance with the factors that have the largest influence on the probability that the user will convert the advertisement after clicking on the advertisement being located near the top of the tree structure 234. The click probability tree structure 234 includes a publisher class node 235, a conversion type node 236, an advertiser node 237, a conversion node 238, a campaign node 240, a publisher node 242, a gender node 244, an age node 246, a size node 248, a creative node 250 and a Vurl node 252.

Probability Update Process

The probability that a user will click on an advertisement or convert on an advertisement can vary over time. For example, the effectiveness of an advertisement might decrease if the advertisement had been shown for a long time. The transaction management system 100 updates that probabilities included in the probability tree structures on a regular basis (e.g., every 15 minutes, every 30 minutes, every 45 minutes, every hour, or every 3 hours).

Figure 9:
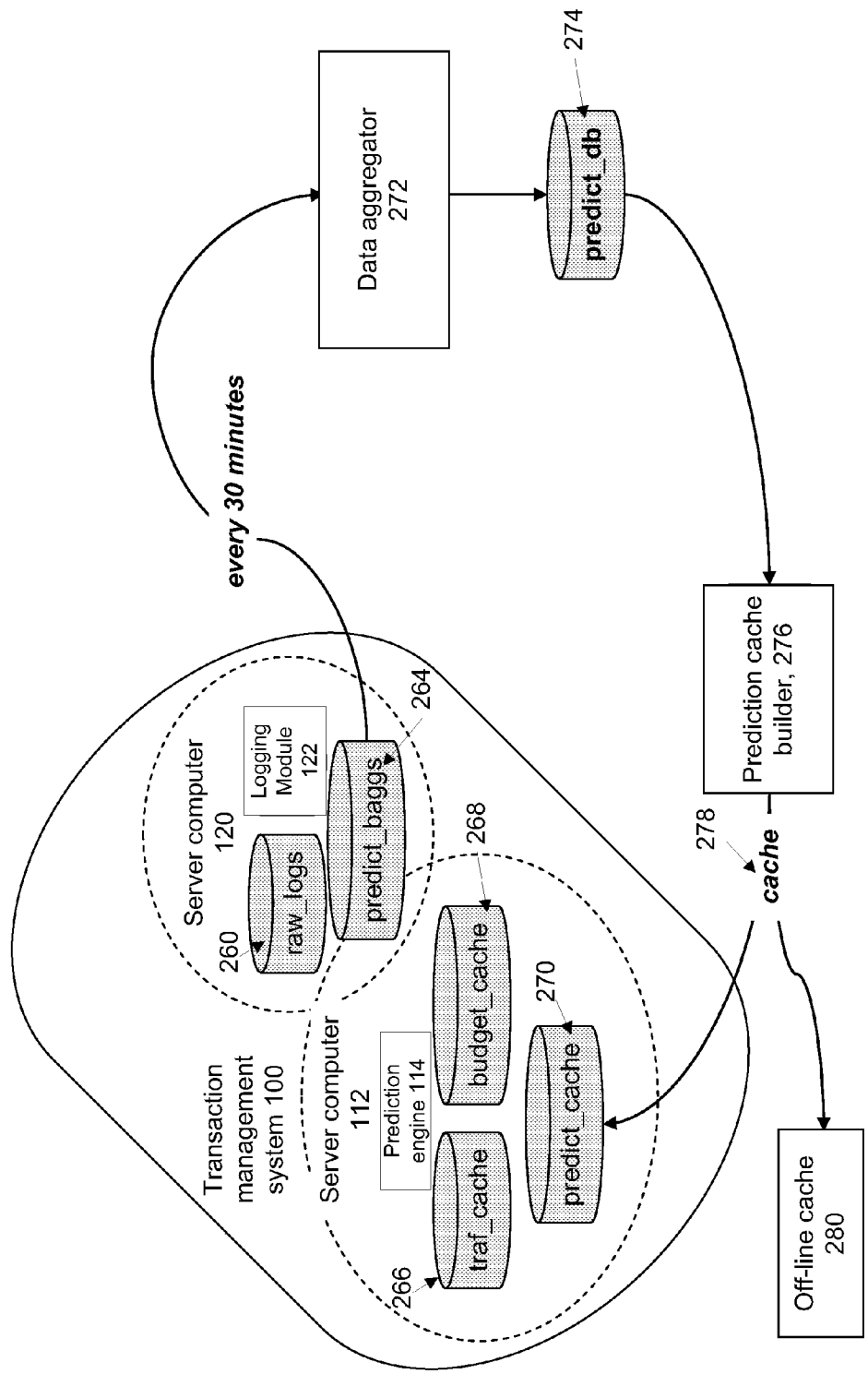
FIG. 9 shows a diagram of an exemplary data flow process for updating a cache of tree structures.

FIG. 9 shows a diagram of an exemplary data flow process for updating the cache that stores the tree structures used to predict the probability a user will take action with respect to an advertisement. As discussed above, the transaction management system 100 includes a server 112 that includes a prediction engine 114 and a server 120 that includes a logging module 122. Although depicted as running on separate server computers, in some implementations, applications 114 and 122 run on a single server computer. In general, server 120 gathers and stores data used to generate predicted response rates and server 112 uses information derived from the information about predicted response rates gathered by server 120 to target advertisements and generate bids for advertisers.

Server 120 collects data from ad servers (not shown) about the response of the user, if any, to an advertisement posted on a website visited by the user and stores the collected data in a data cache 260. The information in the data cache 260 is used to generate data that includes the number of tries, the click rate, the conversion rate and other relevant data in a standardized format. This data is stored in a data cache 264. At predetermined intervals (e.g., every 15 minutes, every thirty minutes, every hour) the data from data cache 264 is transferred from the server computer 120 to a data aggregator 272. The data aggregator 272 aggregates the data from the data cache 262 with previously generated data (e.g., data that was sent in previous time intervals). The data aggregator 272 stores information about whether the user clicked on an advertisement that was posted, whether the user converted the advertisement after viewing the advertisement, and whether the user converted the advertisement after clicking on the advertisement in a prediction database 274. The data aggregator 272 also stores information about the particular advertisement, user, and publisher in the prediction database 274.

The data aggregator 272 aggregates data from a large number of ad servers. As such, prediction database 274 includes a large amount of information. Since the transaction management system 100 uses prediction data to make real-time decisions on the bids for advertisers, the amount of data stored in the data aggregator 272 is prohibitively large to allow the calculations for determining the click or conversion probabilities to be made real-time when the ad is about to be served. In order to reduce the processing required to use click probabilities and/or conversion probabilities to generate a bid at the time a call for an advertisement is posted by a publisher, a prediction cache builder 276 performs calculations using the data in the predict database 274 to generate a cache 278 that includes one or more of a click probability tree, a post-view conversion probability tree, and a post-click conversion probability tree. In order to generate the cache 278, the prediction cache builder uses information about the tries and successes stored in the prediction database 274 to calculate the probability of a user taking action on an advertisement (e.g., as described above). The calculated probabilities (and not the data used to generate the probabilities) is stored in a cache 278.

After prediction cache builder 276 generates cache 278, cache 278 is transferred to a prediction cache 270 in server computer 112 for use in generating bids, and transferred to an off-line cache 280. The off-line cache 280 can be used for marketing research. For example, the off-line cache 280 can be used to determine factors that make a particular type of advertisement successful. In addition, the off-line cache 280 can serve as a back-up cache and can be used to restore the prediction cache 270 if the prediction cache 270 becomes unusable.

Learning

When an advertiser launches a new creative, there is not any data on the tries and successes for the particular creative. Since there is not any data for the new creative, the probability of the new creative resulting in a user taking action on the creative cannot be calculated directly. However, as described above, when there is no data or limited data about the tries and successes of a node, the probability of the node converges to the probability of the parent node. Therefore, for a new creative, the prediction engine assumes that the probability of a user taking action on the creative is the same as for a user taking action on a creative that meets the criteria of the parent node.

For example, referring back to FIG. 4, assume that an advertiser had previously run a creative '54321' (as indicated by block 196*b*) but had not previously run creative '12345'. Based on the tries and successes of creative '54321' the transaction management system 100 generates a click probability tree. If the advertiser then adds creative '12345' the transaction management system 100 does not have any data about the probability that a user will take any action with respect to creative '12345'. Therefore, the transaction management system 100 assumes that the probability of a user taking action when viewing creative '12345' will be the same as the probability of the parent node to creative '12345', namely the age range node 194*b*.

While the probability of a new node may be estimated based on the probability of the parent node, various factors may influence the probability of the user taking action with respect to a particular creative such that the estimated probability overestimates or underestimates the success of the new creative. For example, if an advertiser has a very successful campaign prior to launching a new creative, then the success of the previous creative may lead to the transaction management system 100 overestimating the likelihood that a user will take action with respect to the new creative. As such, if the transaction management system 100 uses the probability to generate a bid, the bid may be too high for the new creative. On the other hand, if an advertiser has previously published a very poor campaign prior to launching the new creative, the transaction management system 100 can underestimate the likelihood that a user will take action with respect to the new creative. For example, imagine a situation in which an advertiser previously ran a campaign with a broken link. The broken link would cause the number of clicks and conversions to be zero. As such, if there were a large number of tries, the probability of success for the creative would approach zero. In this situation, if a new creative were posted for the advertiser, the transaction management system 100 would use the probability of the parent node to estimate the probability of the new creative and underestimate the likelihood of the new creative being successful. As such, the transaction management system 100 might bid too low for the new creative.

In order to ensure that each new creative is given a chance, the transaction management system 100 implements a learning period for each new creative. The learning period is used to allow a new creative to be posted enough times to determine if the new creative will have a high enough click rate and/or conversion rate in combination with offer price to result in the advertiser winning a bid and posting the advertisement to a publisher's website.

While a learning period is used to give each new creative a chance, once a creative is determined to either be successful enough to allow to creative to be competitive in the marketplace or unsuccessful to a point where the chances of the creative being competitive are too low to justify continued learning, the transaction management system 100 does not continue learning for the creative, e.g., the transaction management system 100 does not continue to post the creative. In order to determine when the learning period for a particular creative should end, the transaction management uses an upper limit and a lower limit on the learning period. The upper limit determines when the system has collected a sufficient amount of information on a node that the probability of the node is reliable enough to allow the probability to be used in the marketplace for generating bids for the creative. The lower limit is used to determine when the transaction management system should stop learning on the creative because the chances of the creative being competitive are too low to justify continued learning on the creative.

Figure 10:
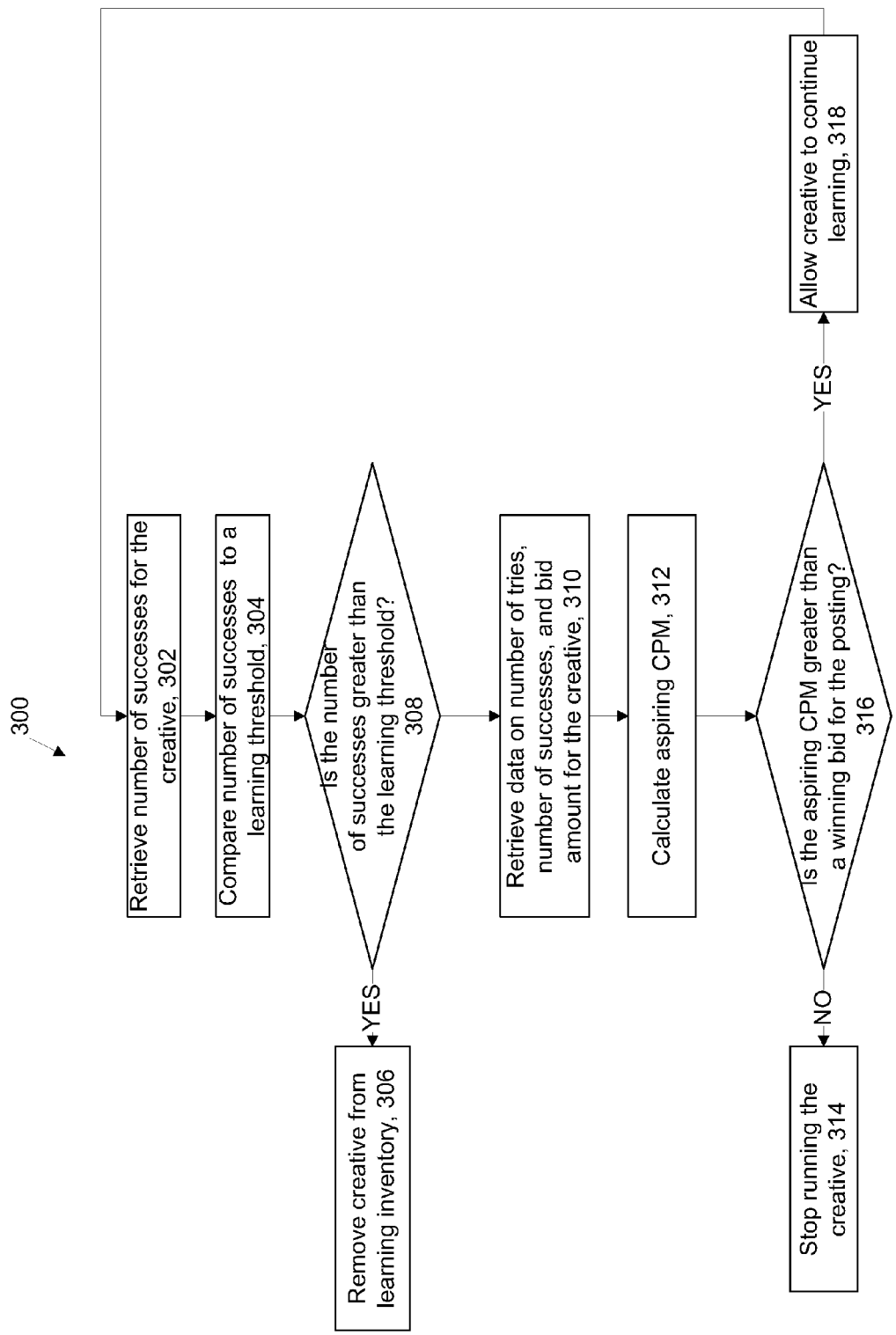
FIG. 10 shows a process for determining whether to continue learning for a particular creative based on upper and lower limits.

FIG. 10 shows a process 300 for determining whether to continue learning for a particular creative based on the upper and lower limits. The transaction management system 100 retrieves a number of successes for a creative (302) and compares the number of successes to a threshold that indicates an upper limit on the amount of learning for a particular creative (304). If the number of successes is greater than the threshold, the transaction management system 100 removes the creative from the learning inventory (306). Once the creative is removed from the learning inventory, the number of tries and successes generated during the learning period are used to determine a probability that a user will act on the creative (e.g., as described above). This probability is subsequently used to generate bids for the creative in response to a publisher posting an ad request.

If the transaction management system 100 determines that the number of successes for the creative is less than the upper limit, then the transaction management system 100 retrieves data on the number of tries, the number of successes, and the bid for the creative (310). The transaction management system uses the collected data to calculate an aspiring CPM (aCPM). The aCPM is an aspiring bid value that uses an estimated bid for the creative and increases the bid using a boost factor. The aCPM is used to determine if the creative is below the lower limit for learning (312). The transaction management system 100 calculates the aCPM according to the following formula:

$$aCPM = \frac{1 + \# \text{ of successes}}{2 + \# \text{ of tires}} * CPC * 1000 * boost$$

where the CPC is the bid amount set by the advertiser and the boost is a factor that helps to raise the bid value for the creative. The numerical value of the boost factor can be set as desired. An exemplary range for the boost factor can be from 2 to 10. The higher the boost factor, the more learning that will be allowed for a creative before determining that the creative has too low of a chance of ever being competitive to justify continued learning for the creative.

After the transaction management system 100 calculates the aCPM for a creative, the transaction management system 100 compares the aCPM to the highest optimized bid for the advertisement posting (316). If the aCPM is lower than the highest optimized bid for the advertisement posting, then the transaction management system stops running the creative because the chances of the creative being competitive are too low to justify continued learning for the advertisement. If the aCPM is higher than the highest optimized bid for the advertisement posting, then the transaction management system 100 allows the creative to continue learning (318).

For example, if a creative has not received any impressions (e.g., this is the first try for the creative), then the aCPM assumes that the success rate of the creative is 50%, this is much higher than the typical success rate for a creative and gives the creative a chance to learn. For example, if the CPC for a particular creative were $1.00 and the boost factor was 5, then for the first impression the aCPM would be $$\frac{1+0}{2+0} * \$1.00 * 1000 * 5 = \$2500.$$

As long as the highest optimized bid for the posting is less than $2500, then the creative can keep learning. Assume that the creative gets more exposure (e.g., is posted more times) through the learning process and still has 0 successes with 100 tries, then the aCPM would be $$\frac{1+0}{2+100} * \$1.00 * 1000 * 5 = \$49.$$

As long as the highest optimized bid for the posting is less than $49, the transaction management system 100 allows the creative to continue learning. Assume that the creative gets even more exposure through the learning process and still has 0 successes with 1000 tries, then the aCPM would be $$\frac{1+0}{2+1,000} * \$1.00 * 1000 * 5 = \$4.99.$$

As long as the highest optimized bid for the posting is less than $4.99, the transaction management system 100 allows the creative to continue learning. Assume that the creative gets more exposure through the learning process and still has 0 successes with 10,000 tries, then the aCPM would be $$\frac{1+0}{2+10,000} * \$1.00 * 1000 * 5 = \$0.49.$$

As long as the highest optimized bid for the posting is less than $0.49, the transaction management system 100 allows the creative to continue learning.

Figure 11:
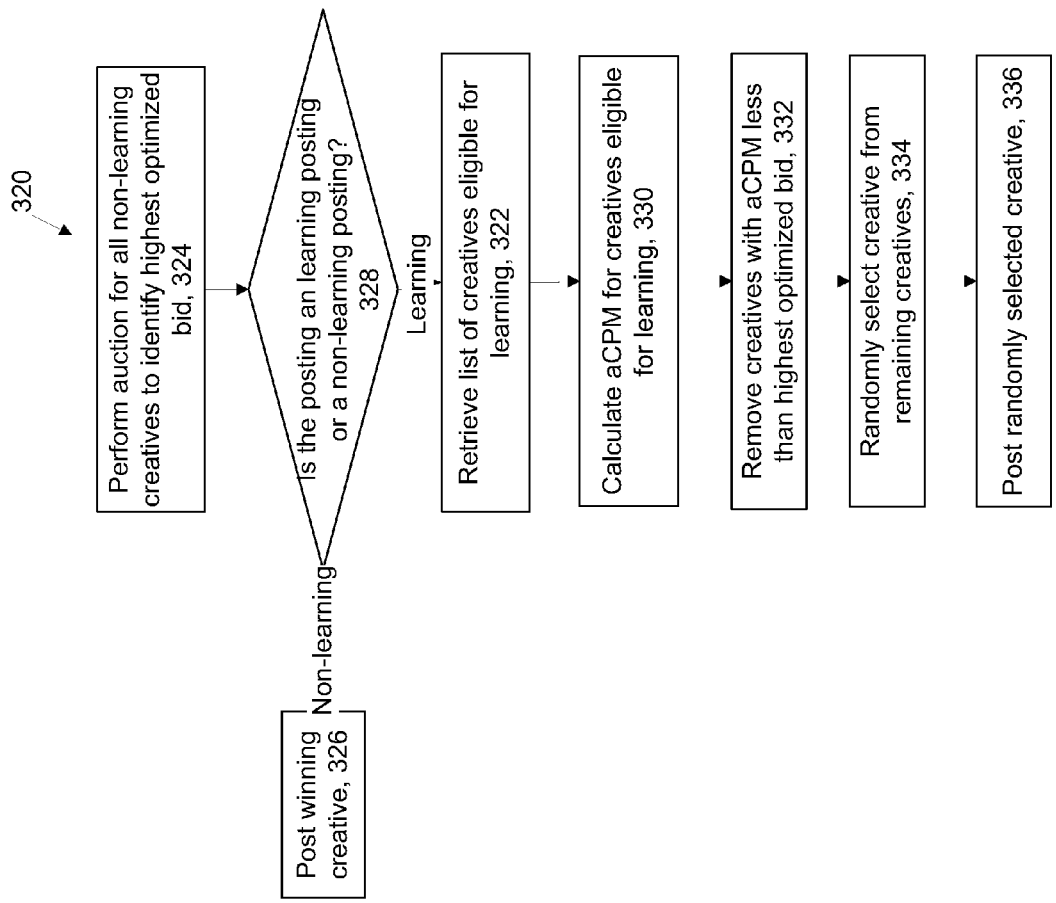
FIG. 11 shows an auction process for selecting an ad creative.

In order for learning to occur, the transaction management system 100 devotes a percentage of the posted advertisements to learning creatives. The allocated inventory for learning is used to allow creatives to receive sufficient impressions to generate information on the probability of a user taking action when the advertisement is posted. FIG. 11 shows an auction process 320 for selecting an ad creative to be served in response to an ad call received by the ad exchange. The transaction management system 100 performs an auction among the non-learning creatives on the ad exchange to identify the highest optimized bid (324). Since a limited amount of inventory is devoted to learning, the system determines whether the ad call is allocated to learning or is for non-learning (328). If the ad call is for non-learning, then the winning non-learning creative is posted in response to the ad call (326). If the ad call is allocated for learning, then the transaction management system 100 retrieves a list of creatives eligible for learning (322). The list of creatives eligible for learning can be determined as described above. For the learning creatives, the transaction management system 100 calculates the aCPM for the creatives included in the list of creatives eligible for learning (330). Based on the calculated aCPM, the system 100 removes any creatives for which the calculated aCPM is lower than the highest optimized bid (332). The transaction management system 100 randomly selects one of the remaining learning creatives (334) and posts the randomly selected creative in response to the ad call (336).

In general, there are two different pricing models for learning inventory, namely action deals and dynamic/arbitrage deals. In the action deals, the advertiser pays on a CPC or CPA basis. In such action-based deals, the publisher makes money only if the user actually takes action with respect to the posted advertisement. As such, the publisher bears the risk of low accuracy nodes where the expected probability of the user taking action is higher than the real probability. In the dynamic/arbitrage based deals, the advertiser pays for posting the advertisement in response to an ad call regardless of whether the user takes action based on the advertisement or not. In dynamic/arbitrage based deals the advertiser, therefore, bears the risk of learning because the advertiser is responsible for paying for the posted advertisements whether they lead to a user clicking on or converting the advertisement. Creatives that are based on action-based pricing model and creatives that are based on a dynamic/arbitrage-based pricing model are both included in the inventory for learning. The amount of money a publisher receives from learning creatives may be less than the amount the publisher could receive in an open auction for posting the advertisement. As such, the publisher can limit the amount of inventory that is allocated to learning. For example, the publisher can limit the inventory to 3%-7% (e.g., 5%) of their total inventory. An advertiser may selectively identify instances in which it elects to match the highest optimized bid value for an advertisement impression on the open advertisement exchange so as to enable a creative designated as learning inventory to be served. In this manner, data on the tries and successes for the particular creative may be obtained.

Throttling

We now describe the use of throttling techniques in an optimized auction. However, the throttling techniques are not so limited and may also be applied to limit bidding in other contexts, such as a learning context.

When pricing for a creative is based on an action-based model, learning for the advertisement is based on the random allocation of learning inventory from the publisher. For creatives where pricing is based on a dynamic/arbitrage model, additional learning can occur based on the advertiser bidding for ad calls from a publisher in the open auction process. In such cases, the advertiser can specify a budget to allocate to learning for the creative. Since the creative is new and is still in the learning phase, the transaction management system 100 assigns a probability to the creative based on the probability of the parent node. However, as described above, there is a risk that the probability may be either too high or too low and assumed by the advertiser that the bid will be high for the new creative. If the predicted probability is too low, then the advertiser will not win bids in the open auction process and the probability for the creative will be determined based on the randomly allocated learning inventory. On the other hand, if the predicted probability is too high, the amount of the bids will also be too high and the advertiser risks over publication of the creative. Over publication of the new creative can result in using the learning budget too quickly. In order to limit the risk of over publication of a creative for which the estimated probability is too high, the transaction management system 100 limits the number of impressions a creative can win on a particular publisher site during a given time period to a throttling threshold that is based in part on a statistical accuracy of bids for the impressions. This technique is referred to herein as 'throttling'.

Referring back to the FIGS. 4 and 5, a probability tree, implemented in accordance with a data framework having a root node level defined by a publisher class factor, intermediate node levels defined by a recency factor, a size factor, an advertiser fact, a publisher factor, a gender factor, an age factor, and a creative factor, and a leaf node level defined by a URL factor, may be assigned a number of different throttling thresholds. In general, the higher the node level (the highest being the root node level and the lowest being the leaf node level), the lower its throttling threshold.

Figure 12:
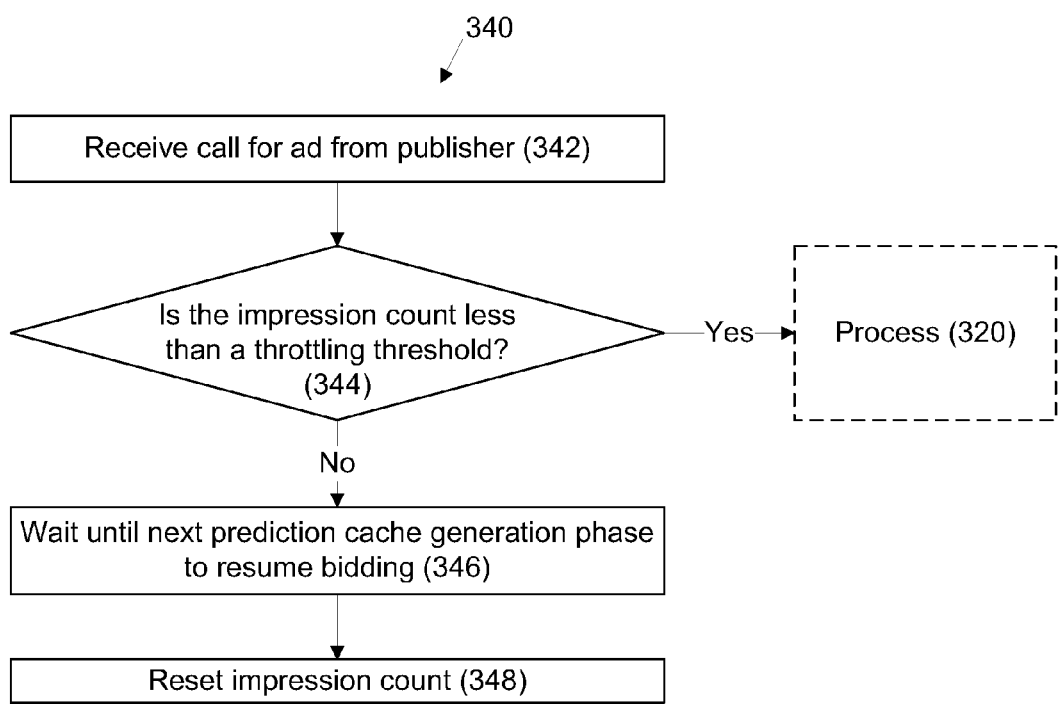
FIG. 12 shows a bid throttling process.

FIG. 12 shows a process 340 for throttling bidding for new creatives to allow for adjustment of the predicted probability of success for the creative. The transaction management system 100 receives a call for an ad from a publisher (342). In response to the call for the ad, the transaction management system 100 determines (344) whether an impression count for the new creative is less than a throttling threshold that has been assigned to the node level, furthest down from the root of the probability tree, which includes a computed probability value. The impression count tracks the number of impressions for the new creative (e.g., the number of times the creative has been posted in response to a call for an ad). If the impression count is equal to or greater than the throttling threshold, the transaction management system 100 waits until the next iteration of the prediction cache 270 to resume bidding for the new creative (346) and resets the impression count to zero (348). However, if the impression count is less than the throttling threshold, the transaction management system 100 performs the process 320 (of FIG. 11) to identify the highest optimized bid for the impression and determine whether the creative is eligible for learning as previously discussed.

Since the throttling threshold limits the number of times per iteration of the prediction cache 270 that an advertisement can be posted based on the predicted probability of success in the prediction cache 270, the risk of over delivery of a new campaign based on inaccurate prediction information is reduced.

Learning Based on Publisher Variables

As described above, both the publisher and the URL are key factors in predicting the likelihood that a user will take action with respect to a creative. However, some URLs and publishers have a small volume of ad impressions available and the volume of ad impressions for the publisher or URL may be too small to allow for optimization of learning. Due to the small volume available for the URL, a creative may never be able to meet the lower limit for learning or it may take a long time for a creative to meet the lower limit. Sometimes creatives often have a limited time that they are useable. For example, an offer may be valid for one month. In addition, an advertiser may budget a certain amount to running the creative during a given time period. In order to address the time constraints of an advertiser, the learning period for a new creative should be short enough to be useful to the advertiser.

For some URLs and publishers the inventory of ad impressions is small enough that the volume may be too low for learning to occur on a time scale that is useful to the advertiser. For example, if a publisher has a website on which 10,000 ad impressions are posted per day and 5% of the ad impressions (e.g., 500 ad impressions per day) are devoted to learning then the inventory for learning is small. If there are 1,000 new creatives and the lower limit for learning is 3 successes, the probability of the creative being posted as a result of the random drawing would result in the new creative being posted once every other day. As such, even if the creative receives a 100% success rate, the learning period would last approximately 6 days. This time period may be too lengthy to be useful to the advertiser.

In one implementation, in order to allow the learning period to be shortened, the transaction management system 100 groups ad impressions based on one or more publisher variables to increase the volume of ad impressions and allow for an adequate volume for learning to occur for a new creative. The ad impression groups used for learning are referred to herein as 'pearls.'

In some embodiments, the ad impressions are grouped on the basis of common second-level domain names. For example, the publisher National Geographic may not have high enough volume on its individual URLs to allow learning to occur for new creatives. In order to facilitate learning, the transaction management system groups multiple different URLs sharing a common second-level domain name into a group for learning (e.g., a pearl). For example, multiple URLs such as http://www3.nationalgeographic.com/animals/index.html, http://www.nationalgeographic.com/history/index.html, http://plasme.nationalgeographic.com/mapmachine/index.html, http://green.nationalgeographic.com/environment, http://news.nationalgeographic.com/news/ index.html, and http://www3.nationalgeographic.com/places/index.html, associated with the animal page, history page, maps page, environment page, the news page, and the people & places page for the National Geographic website, respectively, share a common second-level domain name of "nationalgeographic" and can be grouped into a pearl for learning.

In some embodiments, the individual websites for a particular publisher may not have enough volume to allow for learning, but the publisher as a whole may have a large number of URLs spanning multiple second-level domain names. In such cases, the ad impressions may be grouped on the basis of common subject matter, geography, characteristics of intended audience (e.g., age, gender, and income level), to name a few. For example, the publisher "godaddy.com" owns URLs that span many different second-level domains. The ad impressions associated with the publisher "godaddy.com" can be grouped into different categories (e.g., food, cars, sports, beauty, science, etc.) and the categories can be used to form the pearls. The categories for the pearls can be set by the publisher or by the transaction management system. In some embodiments, the publisher could provide a list of websites to group for learning. By allowing the publisher to assign the groupings, the publisher can divide their ad impressions into groupings that the publisher believes may share characteristics that would influence the likelihood that the user will take action with respect to a creative posted on a given URL.

In some embodiments, the ad impressions for a particular publisher combined may still have too little volume for learning. In such cases, the ad impressions for multiple publishers can be grouped together for learning so that enough volume is available for learning. The grouping can be based on a categorization of the type of website. For example, multiple different food related URLs from different publishers could be grouped into a pearl for learning. In some embodiments, the categories for learning can be established by the transaction management system 100, and a publisher with little volume can assign each of their URLs to one of the learning categories.

Learning Based on Information about a User

In addition to the factors described above about the user, advertiser, and publisher used to generate the predication cache, the likelihood of a user acting on an advertisement (e.g., the click probability) can differ based on characteristics (e.g., characteristics including historical actions taken by the user with respect to advertisements and/or past websites visited by the user) of a user that accesses a website on which the advertisement is published. In order to take advantage of the characteristics of a particular user, in some embodiments, the transaction management system 100 allows the advertiser to target advertisements to users that are believed to be more likely to act on the advertisement based on information included in a cookie on the end user's machine. A targeting module in the transaction management system can allow business entities 1061 . . . n including advertisers and ad networks to place their advertisements on a publisher's webpages or take other actions with respect to bidding or placement of an advertisement based on cookie data identifying an end user machine when the end user machine subsequently accesses the webpage. Details regarding targeting of advertisements based on cookie data for a user can be found in U.S. patent application Ser. No. 11/772,965, entitled "Data Marketplace and Broker Fees;" filed on Jul. 3, 2007, the contents of which are hereby incorporated by reference in its entirety.

For example, if a user has a cookie stored on their machine that indicates that they are shopping for a car, the user may be more likely to take action on a car loan advertisement posted on a website than a user who did not have the cookie information stored on their machine. In some embodiments, the transaction management system can store separate probability trees based on the cookie information. For example, transaction management system could store two probability trees with the same nodes in the tree where one tree is for users having a particular cookie stored on their machine and the other tree is for users who do not have the cookie stored on their machine. In order to generate such separate probability trees, the transaction management system can allocate the learning in inventory for a publisher to enable learning for creatives. For example, the learning inventory for a publisher could be divided into a first group of inventory that is used for learning when a user has a particular cookie stored on his/her machine and a second group of learning inventory that is allocated for learning when a user does not have a particular cookie stored on his/her machine.

Alternative Probability Calculation

While in the embodiments described above, the probability was calculated according to the algorithm:

$$\text{Probability} = \frac{(1 + \text{Success})}{\left(\text{tries} + \frac{1}{\text{probability}_{Parent}}\right)},$$

other algorithms can be used.

In some embodiments, the probability calculated for a particular node can be dependent on both the probability of the parent node and the probability of the child node (e.g., the node directly above and the node directly below the node for which the probability is being calculated). For example, the probability can be calculated using the algorithm of $$\text{Probability} = \frac{(1 + \text{Success}_{node} - \text{Success}_{Child})}{\left(\text{tries}_{node} + \frac{1}{\text{probability}_{Parent}} \text{tries}_{Child}\right)}.$$

If the particular node does not have a child node, $\text{Success}_{Child} = 0$ and $\text{tries}_{Child} = 0$.

While in the embodiments described above, click probability, post-view conversion probability, and post-click conversion probabilities are calculated using the same formula (with different measures for tries and successes), in some embodiments, the click probability, post-view conversion probability, and post-click conversion probabilities can be calculated according to different formulas. For example, an inertial probability formula (e.g., a formula such as $$\text{Probability} = \frac{(1 + \text{Success})}{\left(\text{tries} + \frac{1}{\text{probability}_{Parent}}\right)}$$

or $$\text{Probability} = \frac{(1 + \text{Success}_{node} - \text{Success}_{Child})}{\left(\text{tries}_{node} + \frac{1}{\text{probability}_{Parent}} \text{tries}_{Child}\right)}$$

can be used as a basis for determining the click probability, post-view conversion probability, and post-click conversion probabilities.

The click probability can take into account the frequency with which a particular creative has been previously displayed to a user and how recently the user has viewed the creative. The post-view conversion probability is equal to the inertial probability. The post-click conversion probability is the inertial probability multiplies by the click probability for the node.

The click probability is adjusted based on the frequency and recency of a user viewing a particular creative because it is believed that the frequency and recency of a user viewing a particular creative can affect the likelihood that a user will take action (e.g., click on) a particular creative. For example, if a user has viewed a creative 10 times in the past 5 minutes, the user may be less likely to take action with respect to the creative. In order to calculate the click probability, the inertial probability can be multiplied by a factor that accounts for the frequency and recency at which the creative has been displayed. In order to determine the factor, there are 4 different general categories, namely, a first category for the first time a creative is viewed by a user, a second category for creatives with a low recency (e.g., the creative was seen recently), a third category for creatives with a high recency (e.g., the creative was seen less recently), and a fourth category for users without cookies for which the recency is not known. For creatives in the first category for the first time a creative is viewed by a user the factor equals 1. As such the probability for creatives in this category is equal to the inertial probability. For creatives in the second category (e.g., creatives with a low recency), the factor is calculated according to $$\text{factor} = \left(1 + \frac{\text{recency}}{A}\right)\left(1 - \frac{\text{frequency} - 1}{B}\right)$$

where A and B are constants and recency is a measure of how much time has elapsed between the current impression and the last impression for this creative and frequency indicates how often an impression of this creative occurs. For creatives in the third category (e.g., creatives with a high recency) the factor is calculated according to $$\text{factor} = \left(1 + \frac{\text{recency}}{C}\right)\left(1 - \frac{\text{frequency} - 1}{D}\right)$$

where C and D are constants and recency is a measure of how much time has elapsed between the current impression and the last impression for this creative and frequency indicates how often an impression of this creative occurs. For creatives in the fourth category for users without cookies for which the recency is not known the factor equals 1.

Although the techniques are described above in the online advertising context, the techniques are also applicable in any number of different open exchanges in which products, commodities or services are offered for purchase or sale.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A computer-implemented method comprising:
providing a probability tree of nodes in which each node is associated with a tries value and a success value, and at least one node is associated with a computed probability value representative of a predicted response rate for an advertisement creative; and
computing a first probability value for a first node of the probability tree based on its associated tries value and success value, and a computed probability value associated with a parent node to the first node, wherein the first probability value is computed based on an algorithm that generates a probability value approximately equal to that of the parent node to the first node when the success value associated with the first node approaches zero.

2. The method of claim 1, further comprising:
storing the first computed probability value in the first node of the probability tree.

3. The method of claim 1, further comprising:
computing a probability value for each node of the probability tree based on its associated tries value and success value, and a computed probability value associated with its parent node; and
storing each computed value in the respective node of the probability tree.

4. The method of claim 1, further comprising:
collecting information that defines a tries value and a success value for the first node; and re-computing the first probability value for the first node of the probability tree based in part on the collected information.

5. The method of claim 1, further comprising:
generating a bid for an advertisement placement transaction based on the first computed probability value.

6. A computer-implemented method comprising
providing a probability tree of nodes in which each node is associated with a tries value and a success value, and at least one node is associated with a computed probability value representative of a predicted response rate for an advertisement creative; and
computing a first probability value for a first node of the probability tree based on its associated tries value and success value, and a computed probability value associated with a parent node to the first node, wherein the first probability value is computed by dividing the success value associated with the first node by the tries value associated with the first node when the success value associated with the first node approaches zero.

7. The method of claim 6, further comprising:
storing the first computed probability value in the first node of the probability tree.

8. The method of claim 6, further comprising:
computing a probability value for each node of the probability tree based on its associated tries value and success value, and a computed probability value associated with its parent node; and
storing each computed value in the respective node of the probability tree.

9. The method of claim 6, further comprising:
collecting information that defines a tries value and a success value for the first node; and re-computing the first probability value for the first node of the probability tree based in part on the collected information.

10. The method of claim 6, further comprising:
generating a bid for an advertisement placement transaction based on the first computed probability value.

11. A computer-implemented method comprising:
providing a probability tree of nodes in which each node is associated with a tries value and a success value, and at least one node is associated with a computed probability value representative of a predicted response rate for an advertisement creative; and
computing a first probability value for a first node of the probability tree based on its associated tries value and success value, and a computed probability value associated with a parent node to the first node, wherein the first probability value is computed according to the following $$\text{equation: Probability} = \frac{(1 + Success_{node} - Success_{Child})}{\left(tries_{node} + \frac{1}{probability_{Parent}} tries_{child}\right)}.$$

12. The method of claim 11, further comprising:
storing the first computed probability value in the first node of the probability tree.

13. The method of claim 11, further comprising:
computing a probability value for each node of the probability tree based on its associated tries value and success value, and a computed probability value associated with its parent node; and
storing each computed value in the respective node of the probability tree.

14. The method of claim 11, further comprising:
collecting information that defines a tries value and a success value for the first node; and re-computing the first probability value for the first node of the probability tree based in part on the collected information.

15. The method of claim 11, further comprising:
generating a bid for an advertisement placement transaction based on the first computed probability value.

16. A computer-implemented method comprising:
limiting a number of times advertisement impressions for a first creative are served on a particular publisher site to a throttling threshold that is based in part on a statistical accuracy of bids for the advertisement impressions;
providing a multi-level probability tree of nodes in which each node is associated with a computed probability value representative of a predicted response rate for an advertisement creative;
wherein the bids for advertisement impressions that are based on a computed probability value that is associated with a lower level tree node are more statistically accurate than the bids for advertisement impressions that are based on a computed probability value that is associated with a higher level tree node.

17. The method of claim 16, wherein the multi-level probability tree of nodes comprises:
a root node level that includes at least one publisher class node;

one or more intermediate node levels, each intermediate node level including at least one intermediate node that is subordinate to the root node level; and a leaf node level that includes at least one uniform resource locator node that is subordinate to the one or more intermediate node levels.

18. The method of claim 16, wherein the multi-level probability tree of nodes includes a first level of nodes and a second level of nodes, at least one node of the second level being subordinate to the first level of nodes, the method further comprising:

assigning a first throttling threshold to the first level of nodes and assigning a second throttling threshold to the second level of nodes, the first throttling threshold being less than the second throttling threshold.

19. A machine-readable non-transitory medium that stores executable instructions to cause a machine to:

provide a probability tree of nodes in which each node is associated with a tries value and a success value, and at least one node is associated with a computed probability value representative of a predicted response rate for an advertisement creative; and compute a first probability value for a first node of the probability tree based on its associated tries value and success value according to the following equation:

$$Probability = \frac{(1 + Success_{node} - Success_{Child})}{\left(tries_{node} + \frac{1}{probability_{Parent}} tries_{child}\right)}$$

and a computed probability value associated with a parent node to the first node.

20. The machine-readable medium of claim 19, further comprising instructions to cause the machine to:

store the first computed probability value in the first node of the probability tree.

21. The machine-readable medium of claim 19, further comprising instructions to cause the machine to:

compute a probability value for each node of the probability tree based on its associated tries value and success value, and a computed probability value associated with its parent node; and store each computed value in the respective node of the probability tree.

22. The machine-readable medium of claim 19, further comprising instructions to cause the machine to:

collect information that defines a tries value and a success value for the first node; and re-compute the first probability value for the first node of the probability tree based in part on the collected information.

23. The machine-readable medium of claim 19, further comprising instructions to cause the machine to:

generating a bid for an advertisement placement transaction based on the first computed probability value.

* * * * *